Feb. 6, 1951 R. B. DOME 2,540,813

ANGLE MODULATION DEMODULATOR

Filed Nov. 12, 1947

Inventor:
Robert B. Dome,
by [signature]
His Attorney.

Patented Feb. 6, 1951

2,540,813

UNITED STATES PATENT OFFICE 2,540,813

ANGLE MODULATION DEMODULATOR

Robert B. Dome, Geddes Township, Onondaga County, N. Y., assignor to General Electric Company, a corporation of New York Application November 12, 1947, Serial No. 785,228

6 Claims. (Cl. 250—27)

My invention relates to demodulators of angle modulated carrier waves and more particularly to demodulators of this type which are insensitive to amplitude variations in the carrier waves.

The generic term "angle modulated" used in this application is to be understood as being equally applicable to frequency modulated or phase modulated waves, or to hybrid modulations having characteristics common to frequency or phase modulations.

In the propagation of angle modulated waves undesired amplitude modulation effects may originate from the transmitter directly, or may be caused by interfering waves, or may arise because of lack of uniform gain over the signal selector pass bands of the receiver. It has been necessary to precede the demodulator stage with an amplitude limiter stage, if such amplitude modulations were to be satisfactorily removed from the angle modulated wave.

It is an object of my invention to provide a demodulator for angle modulated waves which is relatively insensitive to any amplitude modulation that might be present thereon.

It is a further object of my invention to provide a demodulator for angle modulated waves which obviates the necessity of an amplitude limiter stage in angle modulation receiving systems.

A still further object of my invention is to provide a discriminator for angle modulated waves, of the "constant current" type, wherein any amplitude modulation that might be present on the angle modulated waves is effectively absorbed in the discriminator, and does not appear in substantial amounts in the discriminator output.

Figure 1:
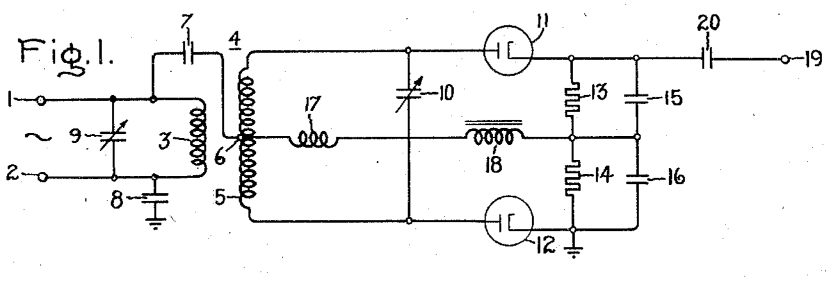
Figure 2:
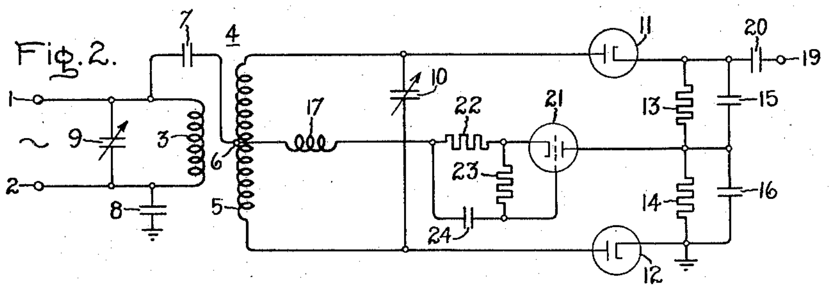
Figure 4:
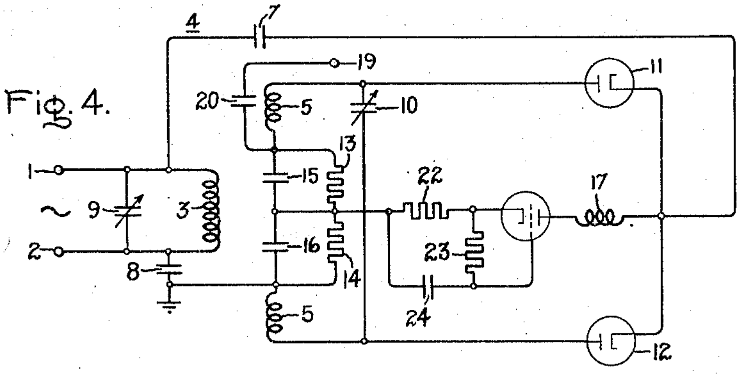
Figure 5:
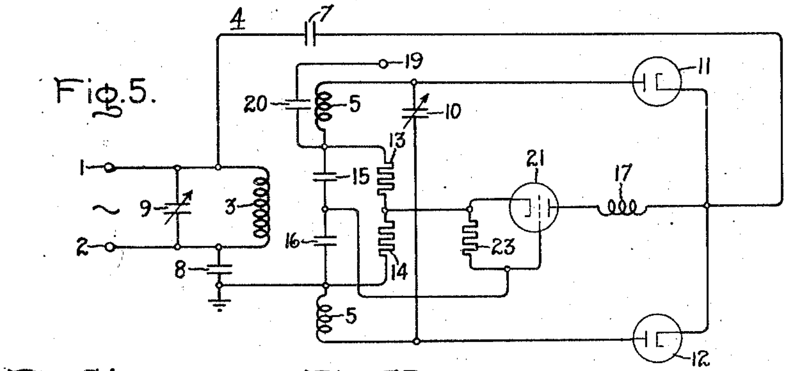
Figure 3A:
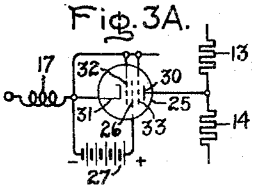
Figure 3B:
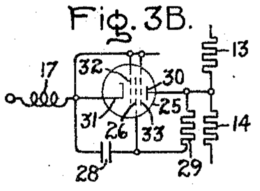

The features of my invention which I believe to be new are set forth with particularity in the appended claims. My invention itself, however, may best be understood by reference to the following description when taken in conjunction with the accompanying drawing wherein:

Fig. 1 shows one form of an angle modulation demodulator according to my invention, Fig. 2 shows a modification of my invention, Figs. 3a and 3b show various modified connections that may be incorporated in the circuit of Fig. 2, Figs. 4 and 5 show still further modifications of my invention.

Referring to Fig. 1, I have shown an angle modulation demodulator in which angle modulated signals, which might also contain undesired amplitude modulations, are applied between the terminals 1 and 2. These terminals may be coupled for example to the output circuit of the final intermediate frequency stage of a superheterodyne type of radio receiver, although my demodulator is not limited to this type of receiving system. The terminals 1 and 2 are connected to the primary winding 3 of a discriminator transformer 4, the transformer 4 also having a secondary winding 5. The center tap 6 of the secondary 5 is coupled to the high potential side of primary 3 through a capacitor 7. The low potential side of the primary 3 is coupled to ground through a capacitor 8 and primary 3 is tuned by a capacitor 9. A secondary tuning capacitor 10 is shunted between the extremities of secondary winding 5. One side of the secondary 5 is connected to the anode of a diode rectifier 11, as shown, and the other side of this secondary is connected to the anode of a diode rectifier 12. The cathode of diode 12 is grounded. Two load resistors 13 and 14 are connected in series between the cathodes of the diodes 11 and 12. The load resistors 13 and 14 are bypassed respectively by shunt capacitors 15 and 16. The center tap 6 of secondary winding 5 is connected through a radio frequency choke coil 17 to one terminal of an audio frequency choke coil 18, the other terminal of the audio frequency choke coil 18 being connected to the junction of the resistors 13 and 14. Audio output is taken between the terminal 19 and ground. The terminal 19 is coupled to the cathode of diode 11 through a capacitor 20.

The circuit described is a conventional balanced discriminator, except that in accordance with my invention, I insert an audio frequency choke coil 18, in the common lead of the rectifier circuits. By the addition of the choke coil 18, I have made the discriminator essentially a "constant current" device. Any amplitude change in the applied signals cannot cause the current through the load resistors 13 and 14 to change, as any such current change in the load resistors would tend to change the current through the audio frequency choke coil 18, and the inductance of this coil opposes any such change. The audio output at 19 is therefore unaffected by any amplitude change in the applied signals. However, any angle modulations in the applied signals cause the current in the load resistors to vary in complementary manner so that their sum at the junction point of these resistors remains constant, and therefore there is no change in the current through the choke coil 18. The output at the terminal 19, however, responds to the angle modulations in the applied signals in the conventional way. The choke coil 18 presents negligible resistance to the unidirectional current flow so that substantially all the useful output of the diode appears across the load resistor 13 and 14.

Fig. 2 illustrates a modification of the circuit of Fig. 1, wherein an electron discharge device replaces the choke coil 18 of Fig. 1, and wherein like numerals designate like components.

In Fig. 2, a triode 21 is shown with its anode connected to the junction of load resistors 13 and 14. The cathode of triode 21 is connected to the radio frequency choke coil 17 through a resistor 22, and the control electrode of triode 21 is coupled to the junction of the choke coil 17 and resistor 22 through a blocking capacitor 24. A resistor 23 is connected between the control electrode and the cathode of the triode 21.

The triode 21 has the property of presenting a low resistance to unidirectional currents and a high resistance to alternating currents. This is similar in some respects to the audio frequency choke coil 18 of Fig. 1. The high resistance presented to alternating currents by the triode 21 is due to the degenerative action of resistor 22 in parallel with resistor 23. The action of the triode 21 may best be understood by the following mathematical analysis:

It can be shown that the resistance offered by the triode circuit to unidirectional current is, $$R_{dc}=R_{22}+r_p \qquad (1)$$

$R_{22}$ is the resistance of the resistor 22
$r_p$ is the plate resistance of the triode The resistance offered to an alternating current by the triode circuit, assuming that the resistance $R_{23}$ of the resistor 23 is very much greater than the resistance $R_{22}$ of the resistor 22, may be represented by, $$R_{ac}=r_p+(\mu+1)R_{22} \qquad (2)$$

where $\mu$ is the amplification factor.

Thus the ratio of $R_{ac}$ to $R_{dc}$ is:

$$\frac{R_{ac}}{R_{dc}}=\frac{r_p+(\mu+1)R_{22}}{r_p+R_{22}} \qquad (3)$$

Now if $r_p$ is very much smaller than $R_{22}$, Equation 3 approximates:

$$\frac{R_{ac}}{R_{dc}}=\mu+1 \qquad (4)$$

Therefore, it can be seen that if the triode 21 is to have the characteristics of the audio-frequency choke coil 18 in Fig. 1, it must have a reasonably high amplification factor.

The extent to which the amplitude modulation of the applied signals is suppressed in my demodulator may be indicated by the following analysis, which is presented by way of example only, and is not to be construed as a limiting factor of my invention. The amplitude modulation suppression S, i. e., the ratio between the amplitude modulation in the input signals and the amplitude modulation in the output signals, may be expressed as the ratio between the alternating current resistance and the unidirectional current resistance of any one diode.

Therefore, $$S=\frac{r_p+(\mu+1)R_{22}+R_{13}}{r_p+R_{22}+R_{13}}$$

and if, for example:

$R_{22}$=100,000 ohms
$R_{13}$=200,000 ohms
$r_p$ = 44,000 ohms
$\mu$ =70 then, $$S=\frac{44{,}000+71\times100{,}000+200{,}000}{44{,}000+100{,}000+200{,}000}=21.23$$

Figs. 3A and 3B show further modifications of my invention, wherein the triode 21 of Fig. 2 is replaced by a pentode 25.

In Fig. 3A, the screen electrode 26 of the pentode 25 is connected to the positive terminal of an unidirectional source 27 and the negative terminal of this source is connected to the cathode 31. The control electrode 32 and the suppressor electrode 33 are connected together and to the cathode 31. When connected in this manner pentode 25 has a very high alternating current plate resistance, but a low unidirectional current plate resistance, and this discharge device may be substituted for the triode in Fig. 2.

I have shown a further arrangement for the pentode connections in Fig. 3B. In this instance, the screen electrode 26 receives unidirectional potential from the anode 30 through a resistor 29. The capacitor 28 by-passes the screen electrode 26 to the cathode 31.

A further embodiment of my invention is shown in Fig. 4. A triode is used in this circuit as in Fig. 2, but there is a rearrangement of the other parts. The secondary 5 of the transformer 4 is separated into two parts, and the load resistors 13 and 14 are connected between the two parts of the secondary winding. The anode of triode 21 is connected to one terminal of the radio-frequency choke 17, and the cathode of triode 21 is connected to the junction of load resistors 13 and 14 through a resistor 22. The cathodes of the diodes 11 and 12 are connected together and to one terminal of the radio-frequency choke coil 17, as shown. The primary voltage is coupled to the common cathode of the diodes 11 and 12 through a capacitor 7. As before, the audio output voltage is taken between the terminal 19 and ground. This terminal is coupled to load resistor 13 through a capacitor 20, as shown.

The operation of the circuit shown in Fig. 4 is similar to the circuits shown in Figs. 1 and 2, and further description of this circuit is believed to be unnecessary.

The circuit of Fig. 4 may be preferable to that shown in Fig. 2, in that the heater-to-cathode leakage resistance in the triode 21, does not shunt the high value alternating current resistance developed by the triode.

The modification of my invention shown in Fig. 5 is similar to that shown in Fig. 4 except that resistor 22 and capacitor 24 of Fig. 4 have been omitted, and the cathode bias is obtained from the common junction of the load resistors 13 and 14. The shunt capacitors 15 and 16 serve the purpose of the capacitor 24 in Fig. 4.

The suppression of the amplitude modulations in the applied signals in Fig. 5 is improved over the circuit of Fig. 4, as the voltage drop in the resistor 22 of Fig. 4 has been eliminated, thus decreasing the unidirectional current resistance in the common path of the diode rectifiers.

I have, therefore, provided a balanced detector-type ratio angle modulation demodulator wherein any amplitude variations in the carrier wave are absorbed, and wherein the audio output signal is a function solely of the angle modulations present in the carrier wave.

While I have shown and described certain embodiments of my invention, it is apparent that other forms and embodiments may be made and I contemplate in the claims to cover any such modifications as fall within the spirit and scope of my disclosure.

What I claim as new and desire to secure by Letters Patent of the United States is:

1. In a frequency discriminator, a source of angle modulated waves, transformer means for applying said waves to a pair of rectifying devices, an output circuit coupled to said rectifying devices, a common return circuit coupled between said transformer means and said output circuit, and an impedance in said common return circuit, said impedance having a relatively low value for unidirectional current and a relatively high value for audio frequencies thereby to absorb audio frequency changes in the amplitude of said angle modulated waves.

2. In a frequency discriminator, a source of angle modulated waves, a frequency discriminator transformer having a primary winding and a secondary winding, and a pair of rectifying devices, means for coupling said primary winding to said source of angle modulated waves, and means for coupling said secondary winding to said rectifying devices, an output circuit coupled to said rectifying devices, a common return circuit coupled between a point on said secondary winding and a point on said output circuit, and an impedance in said common return circuit, said impedance having a relatively low value for unidirectional current and a relatively high value at audio frequencies as compared to the remaining circuit impedance associated with each rectifying device thereby substantially to absorb audio frequency changes in the amplitude of said angle modulated waves.

3. In a frequency discriminator, a source of angle modulated waves, a frequency discriminator transformer having a primary winding and a secondary winding, and a pair of rectifying devices, means for coupling said primary winding to said source of angle modulated waves, and means for coupling said secondary winding to said rectifying devices, an output circuit coupled to said rectifying devices, a common return circuit coupling a point on said output circuit to a point on said secondary winding, and an impedance included in said return circuit, said impedance having a relatively low value for unidirectional current and a value at audio frequencies relatively high as compared to the remaining circuit impedance associated with each rectifying device thereby substantially to maintain constant current through said return circuit and for suppressing audio frequency variations in the current in said return circuit.

4. In a frequency discriminator, a source of angle modulated waves, a frequency discriminator transformer having a primary winding and a secondary winding, and a pair of rectifying devices, means for coupling said primary winding to said source of angle modulated waves and means for coupling said secondary winding to said rectifying devices, an output circuit coupled to said rectifying devices, a common return circuit coupling a point on said output circuit to a point on said secondary winding, and an electron discharge device included in said common return circuit, said device having low resistance for unidirectional current and high resistance for audio frequency currents thereby substantially to reduce the effect of amplitude changes in said angle modulated wave source on said output circuit.

5. In a balanced frequency discriminator for angle modulated waves, a frequency discriminator transformer having a primary winding and a secondary winding, a pair of rectifying devices, means for coupling said primary winding to a source of said angle modulated waves and means for coupling said secondary winding to said rectifying devices, an output circuit for said rectifying devices, a common return circuit coupling a point on said output circuit to a point on said secondary winding, an electron discharge device having an anode, a cathode and a control electrode included in said common return circuit, said device having a first resistor in said cathode circuit, a second resistor connecting said control electrode to said cathode, and a capacitor coupling said control electrode to said cathode through said first resistor.

6. In a frequency discriminator for angle modulated waves, a frequency discriminator transformer having a primary winding and a pair of secondary windings, a load circuit connecting said secondary windings in series, a pair of rectifying devices connected in series across said series of connected secondary windings, a common return circuit connecting the common junction point of said series connected rectifying devices to a point on said load circuit, and an electron discharge device included in said common return circuit, said device having low resistance for unidirectional current and high resistance for audio frequency currents thereby substantially to reduce the effect of amplitude changes in said angle modulated source on said load circuit.

ROBERT B. DOME.

REFERENCES CITED

The following references are of record in the file of this patent:

UNITED STATES PATENTS

| Number | Name | Date |
|---|---|---|
| 2,194,516 | Anderson | Mar. 26, 1940 |
| 2,281,395 | Travis | Apr. 28, 1942 |
| 2,338,526 | Maynard | Jan. 4, 1944 |